UNITED STATES PATENT OFFICE.

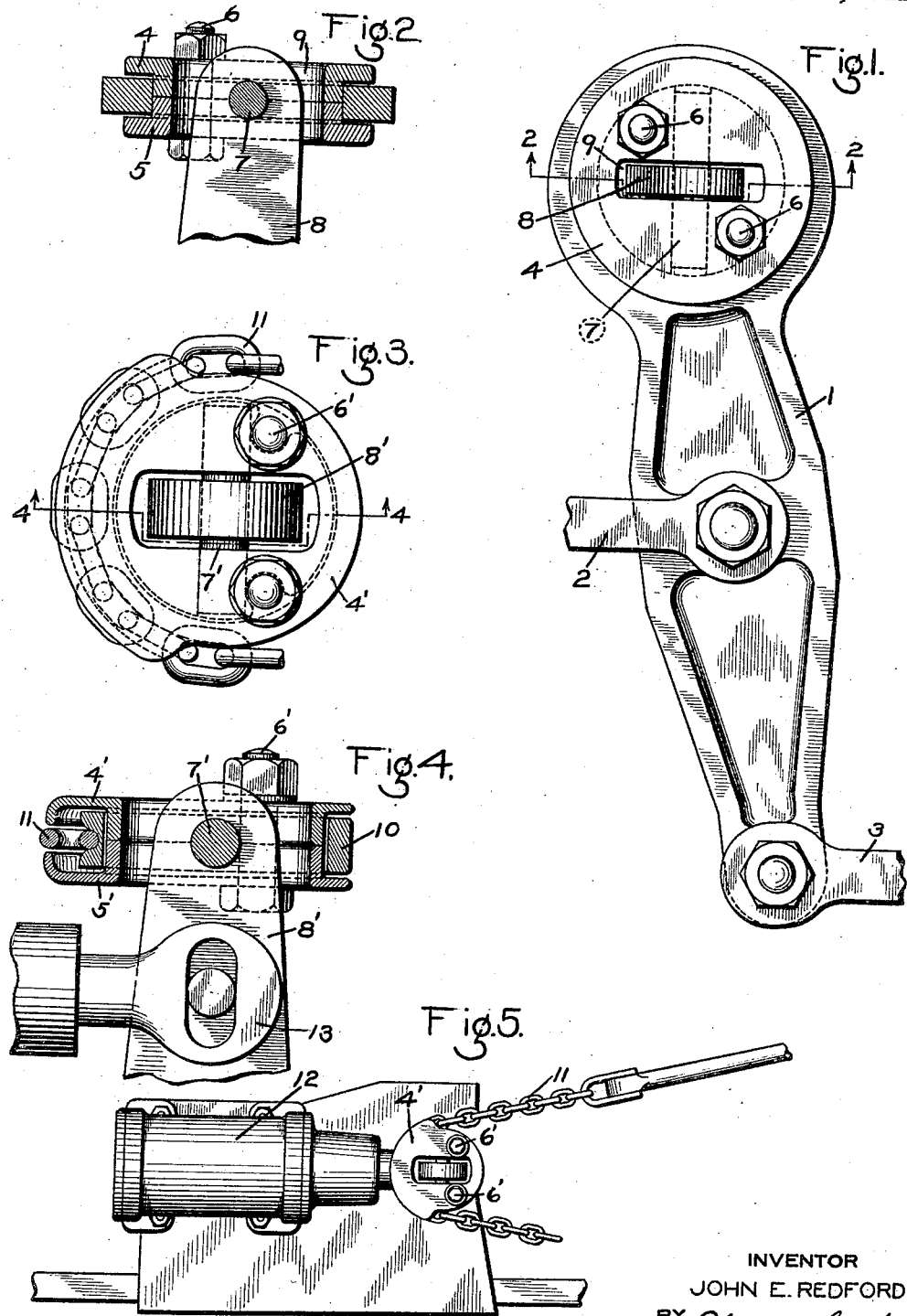

JOHN E. REDFORD, OF KINLOCH PARK, MISSOURI, ASSIGNOR TO THE AMERICAN BRAKE COMPANY, OF ST. LOUIS, MISSOURI, A CORPORATION OF MISSOURI.

BRAKE-LEVER CONNECTION.

1,417,203.

Specification of Letters Patent. Patented May 23, 1922.

Application filed April 27, 1921. Serial No. 464,890.

*To all whom it may concern:*

Be it known that I, JOHN E. REDFORD, a citizen of the United States, residing at Kinloch Park, in the county of St. Louis and State of Missouri, have invented new and useful Improvements in Brake-Lever Connections, of which the following is a specification.

This invention relates to brake rigging, and more particularly to a connection for brake levers.

In some cases, by reason of the limited space available for brake lever movements, it is frequently difficult to obtain adequate space in which to connect up the brake rigging so as to give the best operating conditions for the brake parts.

The usual practice is to offset the brake levers, so as to obtain the desired room for lever movements, but this results in offset forces acting upon the levers and a consequent increase in the size of such levers to withstand such unnatural loaded conditions.

Offset levers also cause wear in the brake parts, due to the strained movement about the fulcrum points.

The principal object of my invention is to provide a brake lever connection in which the above difficulties are overcome and which will permit freedom of movement in all required directions, and at the same time occupy a minimum of space.

In the accompanying drawing; Fig. 1 is a plan view of a brake lever construction embodying my improved brake lever connection; Fig. 2 a section on the line 2—2 of Fig. 1; Fig. 3 a plan view of the improved brake lever connection adapted for hand brake control; Fig. 4 a section on the line 4—4 of Fig. 3; and Fig. 5 a plan view, showing an application of the construction shown in Figs. 3 and 4.

Fig. 1 illustrates an application of my invention to an equalizer lever 1, having connection to the usual connecting rods 2 and 3.

According to my invention, the brake lever end of the equalizer lever 1 is provided with a circular bore which constitutes a bearing for circular flanged plates 4 and 5.

Said plates are secured in position by bolts 6 and clamped between the plates is a pin 7 which forms the pivot pin of a brake lever 8, the plates 4 and 5 having a slot 9 through which the end of the brake lever extends, as clearly shown in Fig. 2.

With the above construction, the equalizer lever 1 has complete freedom of movement in all necessary directions and is also effectively shackled between the plates 4 and 5.

Another application of my invention is shown in Figs. 3, 4, and 5 as adapted for hand brake operation.

In this construction, a sheave 10 is fitted between the flanged plates 4' and 5' for receiving the hand brake chain 11.

The pivot pin 7' is clamped between the plates and is connected to brake lever 8', the brake cylinder 12 having the push rod 13 which is connected to the brake lever 8' in the usual manner.

It will be evident that the sheave may be arranged for cable operation instead of a chain and in fact that the improved connection may be applied in various other locations where flexibility of movement is required.

Having now described my invention, what I claim as new and desire to secure by Letters Patent, is:—

1. In a brake rigging, the combination with a brake lever and a pivot pin for permitting free movement of the lever in one plane, of a mounting for the pivot pin having means for permitting free movement of the mounting in another plane.

2. In a brake rigging, the combination with a brake lever and a pivot pin therefor, of a mounting for said pivot pin and a brake rigging member rotatably connected to said mounting.

3. In a brake rigging, the combination with a brake lever and a pivot pin therefor, of another brake lever and means carrying said pivot pin and rotatably connected to the second brake lever.

4. In a brake rigging, the combination with a brake lever and a pivot pin therefor, of a brake lever connection comprising oppositely disposed plates between which said pin is secured and provided with an annular bearing and a brake rigging member rotatably mounted on said bearing.

In testimony whereof I have hereunto set my hand.

JOHN E. REDFORD.